United States Patent
Narasayya et al.

(10) Patent No.: US 8,630,998 B2
(45) Date of Patent: Jan. 14, 2014

(54) FRAMEWORK FOR TESTING QUERY TRANSFORMATION RULES

(75) Inventors: Vivek R. Narasayya, Redmond, WA (US); Ravishankar Ramamurthy, Redmond, WA (US); Hicham G. Elmongui, Alexandria (EG)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/789,486

(22) Filed: May 28, 2010

(65) Prior Publication Data

US 2011/0295833 A1 Dec. 1, 2011

(51) Int. Cl.
*G06F 7/00* (2006.01)

(52) U.S. Cl.
USPC .......................... 707/713; 707/694; 707/769

(58) Field of Classification Search
USPC ......................... 707/694, 769, 713
See application file for complete search history.

(56) References Cited

U.S. PATENT DOCUMENTS

| | | | |
|---|---|---|---|
| 5,412,806 A * | 5/1995 | Du et al. | 1/1 |
| 5,819,255 A * | 10/1998 | Celis et al. | 1/1 |
| 6,021,405 A | 2/2000 | Celis et al. | |
| 6,240,406 B1 * | 5/2001 | Tannen | 1/1 |
| 7,010,546 B1 * | 3/2006 | Kolawa et al. | 707/694 |
| 7,509,311 B2 | 3/2009 | Galindo-Legaria et al. | |
| 7,599,925 B2 | 10/2009 | Larson et al. | |
| 2002/0107838 A1 * | 8/2002 | Tsai | 707/3 |
| 2006/0282423 A1 | 12/2006 | Al-Omari et al. | |
| 2009/0055362 A1 | 2/2009 | Huang et al. | |
| 2011/0295833 A1 * | 12/2011 | Narasayya et al. | 707/713 |

OTHER PUBLICATIONS

Perng et al., T. Bench-Capon, G. Soda, and A M. Tjoa (Eds.): DEXA 99, LNCS 1677, pp. 218-227, 1999. Springer-Verlag Berlin Heidelberg 1999.*
Kache et al., Transformation Rule Discovery through Data Mining, VLDB '08, Aug. 24-30, 2008, Auckland, New Zealand, pp. 1-4.*
Elmongui et al., A Frame for Testing Query Transformation Rules, SIGMOD'09, Jun. 29-Jul. 2, 2009, Providence, Rhode Island, USA, pp. 257-268.*
Travers, N., An Extensible Rule Transformation Model for XQuery Optimization, 9th International Conference on Enterprise Information Systems (ICEIS), Madeira : Portugal (2007), pp. 1-8.*
Travers et al., TGV: A Tree Graph View for Modeling Untyped XQuery, R. Kotagiri et al. (Eds.): DASFAA 2007, LNCS 4443, pp. 1001-1006, 2007.*

(Continued)

*Primary Examiner* — Cheyne D Ly
(74) *Attorney, Agent, or Firm* — Gonzalez Saggio & Harlan LLP (57) ABSTRACT

Described is a test framework for testing transformation rules of query optimizers. Rule patterns obtained as tree structures from a query optimizer are used to generate queries that are used to test the rule optimizer's transformation rules. The test framework tracks which rules are exercised for each query, and also determines the correctness of the transformation rule by comparing the results of the query processing with the rule and without the rule (by turning off the rule). The test framework creates a composite pattern corresponding to two or more rules, such as to test rules in a set (e.g., as pairs). Also described is the efficient execution of a test suite for correctness testing, in which queries of the test suite are selected based upon cost information.

20 Claims, 5 Drawing Sheets

(56) References Cited

OTHER PUBLICATIONS

Shekhar, et al., "Learning Transformation Rules for Semantic Query Optimization: A Data-Driven Approach", Retrieved at << http://ieeexplore.ieee.org/stamp/stamp.jsp?arnumber=00250077 >>, IEEE Transactions on Knowledge and Data Engineering, vol. 5, No. 6, Dec. 1993, pp. 950-964.

Graefe, et al., "The EXODUS Optimizer Generator", Retrieved at << http://db.informatik.uni-mannheim.de/downloads/hauptstudium/seminare/papers/Exodus_01.PDF >>, ACM SIGMOD Record, vol. 16, No. 3, Dec. 1987, pp. 160-172.

Graefe, et al., "Extensible Query Optimization and Parallel Execution in Volcano", Retrieved at << ftp://ftp.cs.pdx.edu/pub/faculty/graefe/papers/dagstuhl.ps >>, Query Processing for Advanced Database Systems, 1991, pp. 23.

Travers, et al., "An extensible rule transformation model for Xquery optimization", Retrieved at << http://cv.chewbii.com/publi/files/2007-06%20ICEIS%20optimization.pdf >>, International Conference on Enterprise Information Systems (ICEIS), Jun. 2007, pp. 8.

Bati, et al., "A Genetic Approach for Random Testing of Database Systems", Retrieved at << http://66.102.9.132/search?q=cache:NsnCvYyW-msJ:citeseerx.ist.psu.edu/viewdoc/download%3Fdoi%3D10.1.1.97.3435%26rep%3Drep1%26type%3Dpdf+A+genetic+approach+for+random+testing+of+database+systems&cd=1&hl=en&ct=clnk&gl=in&client=firefox-a >>, Very Large Data Bases, Proceedings of the 33rd international conference on Very large data bases, Sep. 23-27, 2007, p. 1.

Chaudhuri, Surajit., "An Overview of Query Optimization in Relational Systems", Retrieved at << ftp://ftp.research.microsoft.com/users/surajitc/pods98-tutorial.pdf >>, Symposium on Principles of Database Systems, Proceedings of the seventeenth ACM SIGACT-SIGMOD-SIGART symposium on Principles of database systems, Jun. 1-4, 1998, pp. 11.

Binnig, et al., "QAGen: Generating Query-Aware Test Databases", Retrieved at << http://i.cs.hku.hk/~ecllo/research/ sigmod07.pdf >>, International Conference on Management of Data, Proceedings of the 2007 ACM SIGMOD international conference on Management of data, Jun. 11-14, 2007, pp. 55.

Bruno, et al., "Generating Queries with Cardinality Constraints for DBMS Testing", Retrieved at << http://research.microsoft.com/pubs/74151/querygen.pdf >>, IEEE Transactions on Knowledge and Data Engineering, vol. 18, No. 12, Dec. 2006, pp. 1-6.

Celis, Pedro., "The Query Optimizer in Tandem's new ServerWare SQL Product", Retrieved at << http://www.sigmod.org/vldb/conf/1996/P592.PDF >>, Very Large Data Bases, Proceedings of the 22th International Conference on Very Large Data Bases, Sep. 3-6, 1996, pp. 592.

Chaudhuri, et al., "Compressing SQL Workloads", Retrieved at << http://www.cse.iitb.ac.in/dbms/Data/Courses/CS632/2006/Papers/workload-comp-sigmod2002.pdf >>, International Conference on Management of Data, Proceedings of the 2002 ACM SIGMOD international conference on Management of data, Jun. 3-6, 2002, pp. 12.

Elhemali, et al., "Unit Testing Query Transformation Rules", Retrieved at << http://portal.acm.org/citation.cfm?id=1385273 >>, International Conference on Management of Data, Proceedings of the 1st international workshop on Testing database systems, Jun. 13-13, 2008, pp. 1-6.

Garey. et al., "Computers and Intractability. A Guide to the Theory of NP-Completeness", Retrieved at << http://elib.tu-darmstadt.de/tocs/125242654.pdf >>, 1979, pp. 4.

Giakoumakis, et al., "Testing SQL Server's Query Optimizer: Challenges, Techniques and Experiences", Retrieved at << ftp://ftp.research.microsoft.com/pub/debull/A08mar/giakoumakis.pdf >>, IEEE Data Eng. Bull., vol. 31, No. 1, 2008, pp. 1-8.

Graefe, et al., "The Volcano Optimizer Generator. Extensibility and Efficient Search", Retrieved at << http://www.seas.upenn.edu/~zives/03s/cis650/P209.PDF >>, Proceedings of the Ninth International Conference on Data Engineering, Apr. 19-23, 1993, pp. 209-218.

Graefe, Goetz., "The Cascades Framework for Query Optimization", Retrieved at << http://docs.google.com/viewer?a=v&q=cache:XO8TMQh9wGkJ:citeseerx.ist.psu.edu/viewdoc/download%3Fdoi%3D10.1.1.98.9460%26rep%3Drep1%26type%3Dpdf+The+Cascades+Framework+for+Query+Optimization&hl=en&gl=in&sig=AHIEtbQwwz4zJAsG9Wc_0mX85jjH1JEhUA >>, IEEE Data Eng. Bull., vol. 18, No. 3, 1995, pp. 19-28.

Haftmann, et al., "Efficient Regression Tests for Database Applications", Retrieved at << http://www.fazit-research.org/fileadmin/_primium/downloads/publikationen/HaKK2005.pdf >>, In Conference on Innovative Data Systems Research, (CIDR), 2005, p. 1.

Mishra, et al., "Generating Targeted Queries for Database Testing", Retrieved at << http://queens.db.toronto.edu/~cmishra/fp302-mishra.pdf >>, International Conference on Management of Data, Proceedings of the 2008 ACM SIGMOD international conference on Management of data, Jun. 9-12, 2008, pp. 12.

Pirahesh, et al., "Extensible Rule Based Query Rewrite Optimization in Starburst", Retrieved at << http://www.dbnet.ece.ntua.gr/~nikos/edith/qopt_bibl/papers/rule_based/starburst_sigmod92_rule_based_qopt.pdf >>, International Conference on Management of Data, Proceedings of the 1992 ACM SIGMOD international conference on Management of data, Jun. 2-5, 1992, pp. 39-48.

Slutz, Don., "Massive Stochastic Testing of SQL", Retrieved at << http://www.cse.iitb.ac.in/dbms/Data/Courses/CS632/Papers/vldb98-RAGS.pdf >>, Very Large Data Bases, Proceedings of the 24rd International Conference on Very Large Data Bases, Aug. 24-27, 1998, pp. 618-622.

Stillger, et al., "Testing the quality of a query optimizer", Retrieved at << ftp://ftp.research.microsoft.com/pub/debull/95SEP-CD.pdf >>, Data Engineering Bulletin, vol. 18, No. 3, 1995, pp. 40-47.

Vazirani, Vijay V., "Approximation Algorithms.", Retrieved at << http://u.cs.biu.ac.il/~porately/2001/algorithm/book.ps >>, 2001, pp. 119.

Zilio, et al., "DB2 Design Advisor: Integrated Automatic Physical Database Design", Retrieved at << http://www.google.com/search?q=cache%3AZmX00Tpwh_0J%3Aciteseerx.ist.psu.edu%2Fviewdoc%2Fdownload%3Fdoi%3D10.1.1.58.6421%26rep%3Drep1%26type%3Dpdf+DB2+Design+Advisor%3A+Integrated+Automatic+Physical+Database+Design&hl=en&gl=in >>, Very Large Data Bases, Proceedings of the Thirtieth international conference on Very large data bases, vol. 30, Aug. 31-Sep. 3, 2004, pp. 1087-1097.

"TPC Benchmark H. Decision Support", Retrieved at << http://www.tpc.org >>, Retrieved Date: Jan. 28, 2010, p. 1.

* cited by examiner

FRAMEWORK FOR TESTING QUERY TRANSFORMATION RULES

BACKGROUND

In contemporary database management systems, query optimizers are responsible for providing a good execution plan for a given query. In general, the way in which a query optimizer transforms an input query into an execution plan determines the performance of a processing a query. As a result, a query optimizer needs to be thoroughly tested before being implemented in an actual database management system to ensure that it functions correctly.

Many contemporary query optimizers are transformation rule-based optimizers, which use rules to transform input queries into more optimal ones. To test such optimizers, rule testing is needed with respect to "coverage" and "correctness." Coverage refers to ensuring that a given transformation rule has been exercised during query optimization in several different queries. Correctness refers to verifying that the transformation does not alter the results.

It is thus desirable to have tests cases in the form of SQL queries such that when the queries are optimized, they exercise all rules that need to be tested. Further, it is valuable to test that a set of rules (e.g., generally pairs of rules) are exercised together in a query, because this tests for any issues caused by rule interactions.

Contemporary testing techniques use stochastic methods to randomly generate SQL queries in a trial-and-error approach until a query is found that exercises the desired rule or rule pair, for example. However, this can take many trials to even find a single query that exercises the given rule or rule pair, let alone finding several such queries. For example, consider a transformation rule that pulls up a Group-By operator over a left outer-join; a randomly generated query is not likely to succeed unless by chance it includes a Group-By and a left outer-join in the same query, which make take a large number of trials. Further, such randomly generated queries tend to be rather complex, and thus optimizing the query in each trial can take a large amount of time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which rule patterns (e.g., obtained as tree structures from a query optimizer) are used by a test framework to generate queries that are then used to test the rule optimizer's rules. The test framework tracks which rules are exercised for each query.

The test framework receives results of the query processing, and instructs the query optimizer to turn off at least one transformation rule that corresponds to the rule pattern. The test framework provides the query to the rule optimizer for query processing with the transformation rule turned off, and determines the correctness of the transformation rule by comparing the results of the query processing (without the transformation rule turned off) against the results of the query processing with the transformation rule turned off.

In one aspect, the test framework creates a composite pattern corresponding to two or more rules, such as to test rules in a set (e.g., as pairs). The composite pattern may be created by combining the rules with a UNION operator, and/or by substituting one rule pattern into a generic operator of another rule pattern, (and/or vice-versa).

In one aspect, the rules to test and available queries comprises data that corresponds to a graph of rule nodes and query nodes. Cost information associated with the query nodes or edges between the rule nodes and query nodes is used to basically select a subset of the graph, and select corresponding queries for inclusion in a test suite that efficiently tests the rules to be tested.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a framework for testing query transformation rules, which enables the efficient generation of queries that exercise a particular transformation rule or a set of rules, thereby performing rule coverage testing. Also described is the efficient execution of corresponding test suites for correctness testing.

To this end, query generation is based on the concept that for a particular rule to be exercised during query optimization, an input logical query tree (where a logical query tree is a tree of logical relational operators in which each operator has been instantiated with its arguments) contains a "pattern" corresponding to that rule. In other words, existence of such a pattern in the logical query tree is a condition for the rule to the exercised. Further, correctness testing is performed, including by a compressed test suite as described herein.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data processing in general.

Figure 1:
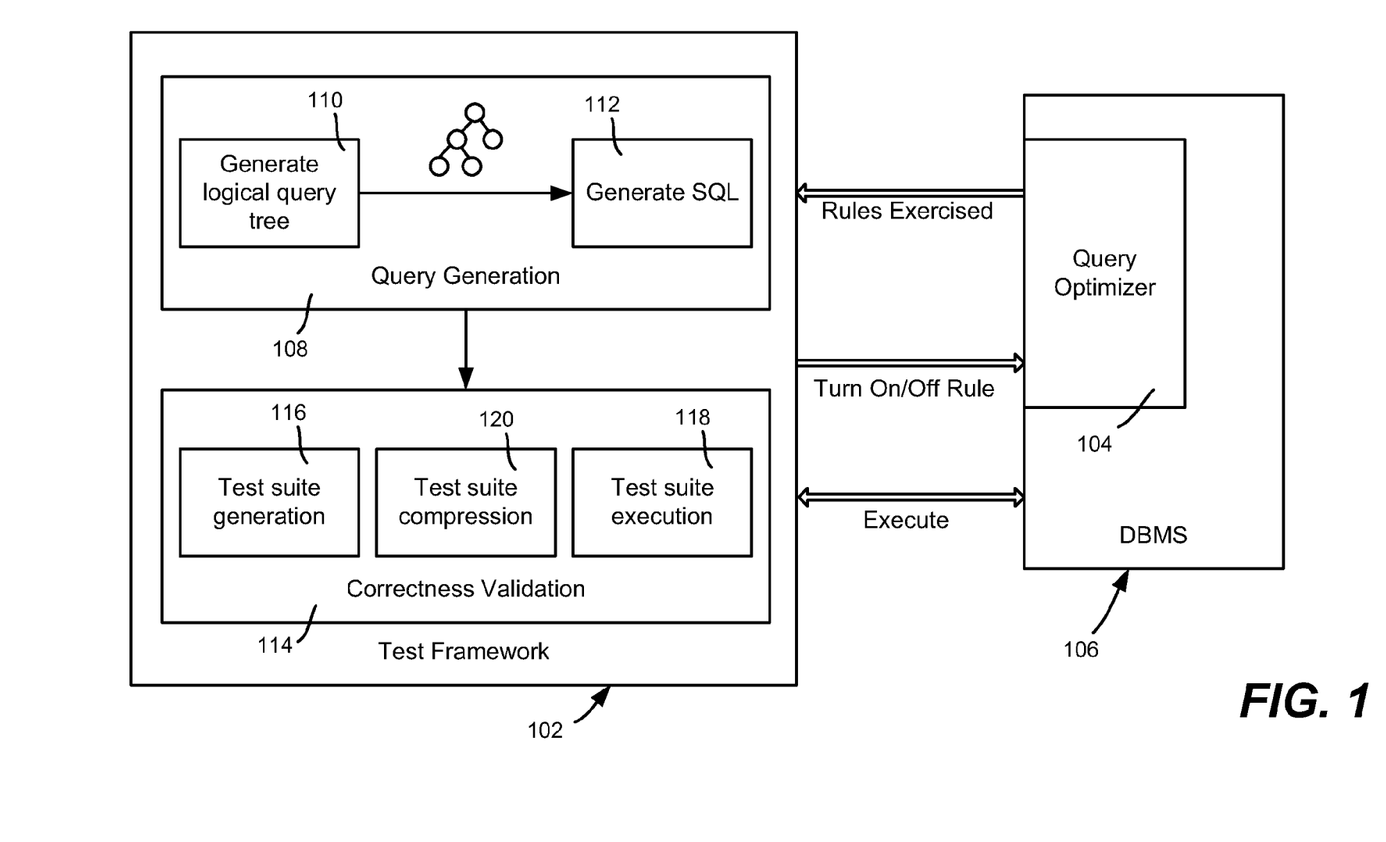
FIG. 1 is a block diagram representing example components of a test framework for testing a transformation rule-based query optimizer.

FIG. 1 is a block diagram showing example components of a test framework 102 for testing a query optimizer 104 of a database management system (DBMS) 106. In general, a transformation rule-based query optimizer 104 uses a top-down approach to query optimization, in which the optimizer is initialized with a logical tree of relational operators corresponding to the input query. A general goal of the optimizer is to transform the input logical tree to an efficient physical operator tree that can be used to implement the query.

For this purpose, transformation rules are used to generate different alternative plans for executing a query. The set of rules that are available to the optimizer essentially determines the search space of plans considered by the optimizer and thus determines the quality of the final plan. One type of transformation rules are exploration rules or logical transformation rules, which when exercised transform logical operator trees into equivalent logical operator trees. Some examples of exploration rules include join commutativity and pushing group by below join. Another type includes implementation rules or physical transformation rules, which when exercised transform logical operator trees into hybrid logical/physical trees. Example implementation rules include rules that transform a logical join into a physical hash join.

The query optimizer 104 of FIG. 1 comprises any suitable transformation rule-based query optimizer that includes the ability to report which transformation rules are exercised (which rules "fired") during query processing after optimization. This allows the test framework 102 to track for any query Q which rules were tested (RuleSet(Q)).

The query optimizer 104 of FIG. 1 also includes a mechanism for the test framework 102 to turn off a given set of one or more transformation rules, along with the ability to optimize and execute a query when that rule set is turned off. In other words, the query optimizer 104 enables obtaining the execution plan Plan(Q, ¬ R) for any query Q and set of one or more rules R (where the symbol '¬' denotes disabled/turned off). Note that many existing optimizers may already have such functionalities.

The test framework 102 includes a query generation component 108 that takes as input a set of one or more rules R, and generates a SQL query such that all rules in R are exercised when that query is optimized. As will be understood, the query generation component 108 thus is useful for testing code coverage.

As represented in FIG. 1, the exemplified query generation component 108 includes two modules, namely a generate logical query tree module 110 and a generate SQL module 112. The generate logical query tree module 110 generates a logical query tree that is able to (potentially) exercise a given rule or rule pair. The generate SQL module 112 inputs a logical query tree (from the module 110) and generates a SQL statement corresponding to the query tree; (note that in general, such technology for generating SQL from a query tree are well known in the art).

The test framework 102 implementation shown in FIG. 1 also includes a correctness validation component 114 that is directed towards correctness testing. Correctness testing may be performed for singleton rules, rule pairs or in general over any subsets of rules, however for purposes of simplicity, most examples herein are described with respect to singleton rules and rule pairs, with the descriptions of singleton rules being generally applicable to rule pairs.

To validate correctness of each rule, the correctness validation component 114 generates k distinct queries, each of which exercises (at least) that rule, which is referred to herein as the "test" suite for a singleton rule $\{r_i\}$, denoted by $TS_i$. If there n singleton rules, there are k distinct queries for each of the n rules. Thus, the overall test suite for all rules is:

$$TS = U_{i=1...n} TS_i.$$

The correctness validation component 114 includes a test suite generation module 116 that generates a test suite as described herein for a given set of rules (k is an input parameter). Queries in the test suite may be generated by invoking the above-described query generation component 108.

For a given test suite, the test suite execution module 118 executes the test suite. More particularly, for each query q in $TS_i$, the test suite execution module 118 executes Plan(q) and Plan (q, ¬ $\{r_i\}$) (the plan and the plan with the rule $r_i$ disabled, respectively), and checks if the results of executing the two plans are identical. If Cost(q,) refers to the cost of executing Plan(q,) for a query q, and Cost(q, ¬ $\{ri\}$) refers to the cost with the rule $r_i$ turned off, the total cost of executing a test suite is:

$$TotalCost = \sum_{i=1}^{n} \sum_{q \in TSi} \text{Cost}(q) + \text{Cost}(q, \neg \{r_i\})$$

The technique of generation and execution of a test suite, where k distinct queries are generated and executed for each rule independently, is referred to herein as the baseline method. Because there are many rules, and k queries are executed for each rule (with both the rule on and off), the time taken for the baseline method can be significant. As described below, however, the efficiency of correctness testing can be significantly improved while still ensuring that each rule is validated for the k distinct queries through the use of a test suite compression module 120. More particularly, the test suite compression module 120 identifies a subset $TS' \subset TS$, while satisfying the constraint that TS' contains k distinct queries for each rule, where that rule is exercised. As described below, general objective of test suite compression is to minimize the cost of executing the test suite, and thereby substantially improve upon the baseline method.

Turning to additional details of query generation, a set of transformation rules for the query optimizer 104 may be represented by $R = \{r_1, \ldots r_n\}$. as mentioned above, the RuleSet(q) for a query q refers to the subset of transformation rules that are exercised when the query is optimized.

Given a transformation rule, the query generation component 108 needs to generate a SQL query that exercises the transformation rule when optimized. One challenge in generating a query that exercises a particular rule is that it is difficult to capture the sufficient conditions for the rule to be exercised, because in general, the exact preconditions for a rule to be exercised can be arbitrarily complex. For example, the search algorithm used by the optimizer may discard a rule based on constraints/heuristics; there also may be cases of rule dependencies, where the exercising of one rule occurs only when one or more other rules are first exercised.

By way of example, consider an input logical query tree: R Join (S LOJ T), where LOJ stands for left outer-join. Consider the Associativity of Join and Outer-join rule, and the Join commutativity rule. In general outer-joins and joins do not commute. However, if the join predicate is between R and S, then the first rule can be exercised, which results in a logical tree (R Join S) LOJ T. The second rule can now be applied on (R Join S).

The test framework 102 tracks which optimizer rules actually were exercised during query optimization by using a "RuleSet" interface to the database management system 106. Moreover, the framework 102 leverages rule patterns that serve as a condition for a transformation rule to be exercised in the query optimizer for the purpose of query generation. Note that the database management system 106 includes an API or the like through which it returns the rule pattern tree for a rule, e.g., in XML format. In most cases, this significantly reduces the number of trials needed to find a query that exercises the given rule or rules.

With respect to exploiting rule patterns, in general, rules in a transformation-based optimizer may be represented by the triple (Rule Name, Rule Pattern, Substitution). During query optimization, a rule engine checks if the input logical tree matches the Rule Pattern. If so, it invokes a Substitution function that generates a new logical tree that is to be included as part of its search. Thus a general condition for a rule to be exercised is that the logical tree that is considered during the search contains the pattern of the corresponding rule.

Figure 2A:
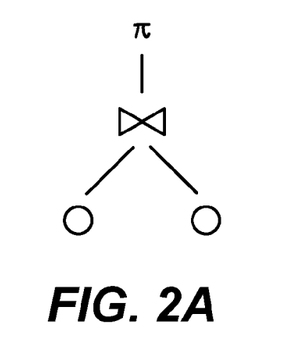
FIGS. 2A and 2B are representations of tree structures representing rule patterns corresponding to a transformation rules.
Figure 2B:
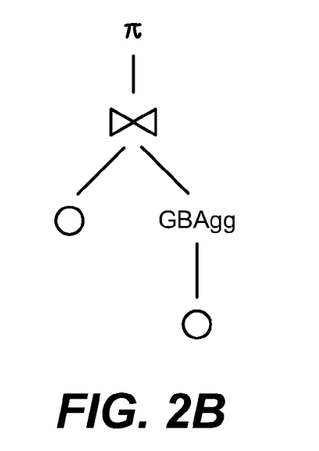

FIGS. 2A and 2B illustrate examples of rule patterns for two transformation rules, namely the join commutativity rule, and a rule for pulling a Group-By Aggregate (GBAgg) above a join operator. As shown, the rule patterns include operators that are present (such as the Join and the GBAgg operator in FIG. 2B), as well as placeholders for generic operators (represented by circles in the patterns). These generic operators can match any logical operator. Thus, for the first rule pattern (for the join commutativity rule) to be exercised, the input logical query tree needs to have a join operator (irrespective of what its children are).

As described above, the generate logical query tree module 110 takes a rule as input and outputs a logical query tree. To generate a query that exercises a particular transformation rule, the query generation component 108 builds a logical query tree starting with the rule pattern and instantiates actual operators in place of the generic operators, such as by random generation. For example, for the join commutativity rule, the query generation component 108 may instantiate each of the generic operators with Get operators, comprising leaf operators that correspond to accessing base relations.

Figure 3:
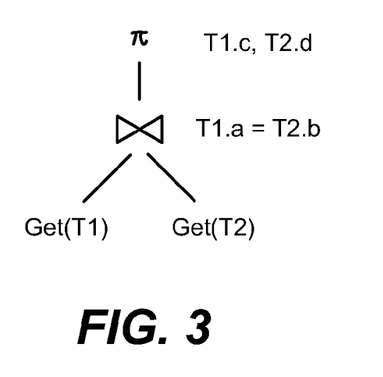
FIG. 3 is a representation of a tree structure with arguments instantiated for generic operators from which a query language query may be generated.

Once the operators are instantiated, the arguments for each operator are selected. For example, the Get operators can be instantiated with relations T1 and T2, respectively, as their arguments. Similarly, the join operator can be instantiated with a join predicate such as T1.a=T2.b as its argument. In this manner, a valid logical query tree (e.g., the tree shown in FIG. 3) is generated. As described above, the generate SQL module 112 is invoked to process such a logical query tree to generate a valid SQL statement.

Note that rule patterns can also provide sufficient conditions for implementation rules to be exercised. For example, for the hash join implementation rule to be exercised, the input pattern needs to include a join operator node. Thus, the idea of leveraging rule patterns from the optimizer allows automatically generating queries that exercise a particular rule.

In general, a logical query tree that contains a rule pattern is not sufficient to guarantee that the particular rule is exercised during optimization. For example, for the rule that pulls up the Group-By Aggregate over a join, some additional conditions need to hold, (e.g., the join predicate does not reference the aggregate results). However, if such constraints are well abstracted in the database engine, they may be potentially added as additional preconditions on the input pattern and leveraged by the query generation module. Certain rules also may require that certain constraints on the schema or the data instance hold in order to guarantee that it is exercised.

In addition to testing single rules, pairs (or any set in general) of rules may be tested to cover rule interactions. Given a pair of transformation rules ($r_1$, $r_2$), a SQL query needs to be generated that exercises both of the rules when optimized. The rule patterns for individual rules can also be leveraged for generating the conditions to exercise a set (e.g., pair) of rules through the concept of rule pattern composition as described below.

Figure 4:
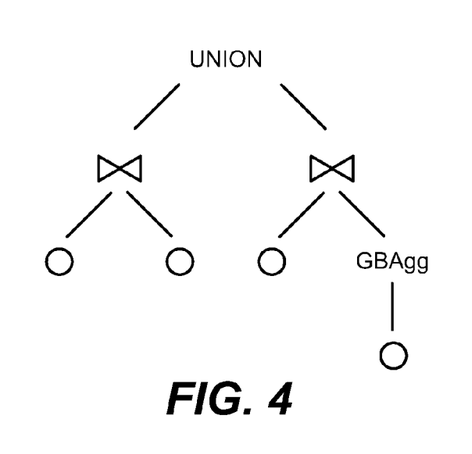
FIGS. 4-6 are representations of tree structures representing composite rule patterns each corresponding to two combined transformation rules.

Consider the two rule patterns shown in FIGS. 2A and 2B for the join commutativity rule and the rule for pulling up the Group-By Aggregate over a join. In order to generate a query that exercises both the rules, the rule patterns may be combined. To this end, the framework 102 may create a new pattern with a root operator as join or UNION (FIG. 4) and both of the initial patterns as the corresponding children. However, a UNION operation may be relatively inefficient.

Figure 5:
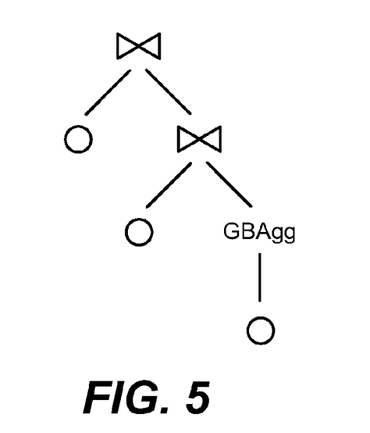
Figure 6:
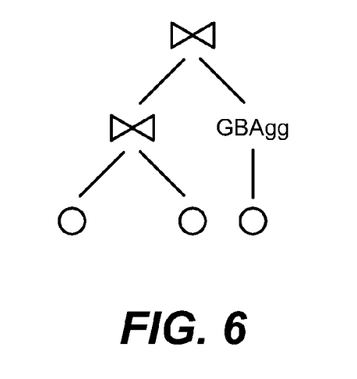

Alternatively, as generally represented in FIGS. 5 and 6, any generic operators in a pattern (represented as circles) may be substituted with the other pattern to create a composite pattern. Thus, after substitution the trees in both FIGS. 5 and 6 are available for use for generating SQL queries (after instantiating the generic operators).

To select a query corresponding to one of the composite patterns after substitution, one implementation of the query generation module generates a query corresponding to each of the composite patterns and selects the query with the least number of operators that exercises both the rules. Note that rule composition captures interactions between rules, e.g., rule $r_1$ is exercised on an expression which is an input to the expression on which rule $r_2$ is exercised. There are other feasible patterns of rule interactions.

Turning to aspects of correctness testing, correctness testing in general is often able to find test cases (bugs) where a rule is not correctly implemented. One methodology for finding such correctness bugs checks the results produced by a query when the rule is exercised versus the results of the same query when the rule is not exercised. To this end, as represented in FIG. 1, a given rule may be turned on/off during query optimization, and the two plans (if actually different) executed. Although there is no guarantee a bug will be found, by repeating this methodology for several different randomly generated queries (e.g., generated via a stochastic method), confidence in the correctness of the rule is increased. Note that unlike code coverage, the queries used for validating correctness need to be executed, and thus efficiency is desirable.

With respect to efficient correctness testing of rules, described herein is a mechanism, referred to as test suite compression, which often significantly reduces the time taken to execute a test suite for correctness testing of a set of transformation rules. To this end, when a query is optimized, multiple rules are often exercised and the information as to which ones were exercised is returned; this information can be used to reduce the number of queries that need to be generated to test the full set the desired number of times. Note the cost of a query when a rule is turned off can sometimes be much higher than the cost of the query when the rule is turned on. In general, given an initial set of randomly generated queries, test suite compression identifies the ways to map queries to rules, and selects queries such that the time taken to run the entire test-suite is minimized (while maintaining certain invariants).

Figure 7:
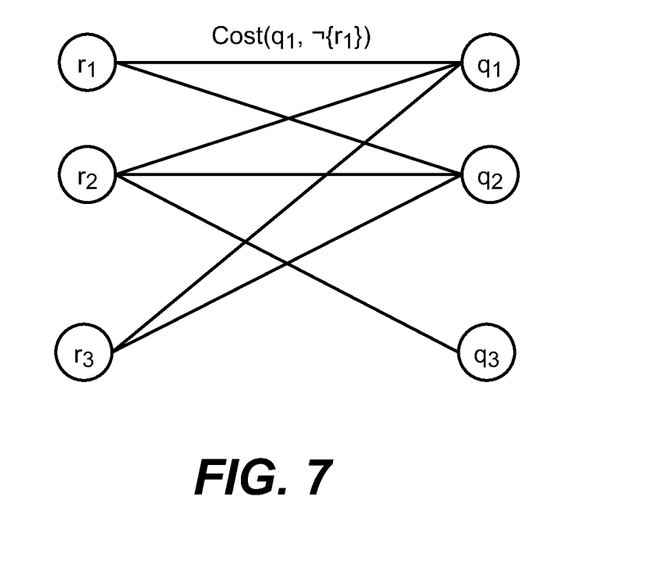
FIG. 7 is a representation of a bipartite graph in which rule nodes and query nodes are connected by edges, and the query nodes have associated costs used to select a subset of the graph to obtain test suite of queries

More particularly, let $R=\{r_1, \ldots r_n\}$ denote the set of transformation rules to be evaluated, let the test suite size be k, and let TS denote the overall test suite for all rules, i.e., $TS=\cup_i TS_i$. As generally represented in FIG. 7, the relationship between the rules and the queries in the test suites (e.g., for example rules $\{r_1, r_2$ and $r_3\}$ and queries $\{q_1, q_2$ and $q_3\}$) may be represented by a bipartite graph. An edge between a rule $r_i$ and a query $q_j$ denotes the fact that rule $r_i$ is exercised when query $q_j$ is optimized. Note that a query belonging to $TS_i$ (the test suite generated for rule $i_i$) potentially may exercise other transformation rules as well. By exploiting this information, the efficiency of test suite execution may be improved.

By way of example, consider an example case when $R=\{r_1, r_2\}$, the rule test suite size (k) is 1, and the corresponding test suite for the rules are $TS_1=\{q_1\}$ and $TS_2=\{q_2\}$; thus, $TS=\{q_1, q_2\}$. Assume that $r_1$ is the only rule triggered when $q_1$ is optimized, whereas both rules are triggered when $q_2$ is optimized. In this example, the costs associated with the queries are:

$Cost(q_1)=Cost(q_2)=100$.
$Cost(q_1, \neg\{r_1\})=180$.
$Cost(q_2, \neg\{r2\})=120$.
$Cost(q_2, \neg\{r_1\})=120$.

The baseline method for test suite execution is:
Execute $Plan(q_1)$ and $Plan(q_1, \neg\{r_1\})$.
Execute $Plan(q_2)$ and $Plan(q_2, \neg\{r_2\})$.

The cost of the baseline method for this example is: (100+180)+(100+120)=500. One alternative is to use query $q_2$ for validating both rules. The cost of this strategy includes:
Execute $Plan(q_2)$ and $Plan(q_2, \neg\{r_1\})$
Execute $Plan(q_2, \neg\{r_2\})$ Note that $Plan(q_2)$ need not be executed when validating $r_2$ because it was executed when validating $r_1$ (and thus its results are already available). Thus, the cost of this strategy is (100+120)+(120)=340, which is less expensive than the baseline method. From the above example, note that there are some observations that can be leveraged in test suite compression. For one, when a query q exercises multiple rules, Plan(q) (with all rules enabled) needs to be executed only once. For another, because the randomly generated queries can have widely varying costs, this fact may be leveraged to reduce the cost by choosing queries with lower cost. Further, the cost of the query with the rules disabled may be significantly higher than when the rules are enabled (e.g., if the rule is responsible for pushing selection below a join, disabling that rule can dramatically increase the cost of the query). Therefore, this information may be considered during test suite compression.

The test suite compression problem is described below for the singleton rule case, although the formulation extends in a straightforward way for the case of rule pairs. More particularly, consider the bipartite graph $G=(V,E)$, where $V=(R\cup TS)$ and E is the set of edges in the graph. In the graph, an edge is added between a rule $r_i$ and query q if optimizing q exercises rule $r_i$. Each node $r_i$ is assigned a zero cost, and each node q is assigned a cost equal to Cost(q). For each edge $(r_i, q)$ assign the cost equal to $Cost(q, \neg\{r_i\})$, that is, the cost of executing the query q with the rule $r_i$ disabled. The test compression problem is to find a subgraph $G'=(V',E')$ of the above bipartite graph according to conditions:

1) $V'=(R\cup TS')$ and $TS' \subset TS$. In other words, the subgraph contains all rules from G and a subset of the queries from G.
2) Each node $r \in R$ in G' has degree equal to the test suite size k.
3) The sum of the edge and node costs in G' is minimized.

The process intends to find the mapping of queries to rules with the minimum cost (condition 3) such that every rule is accounted for (condition 1) while ensuring that each rule is mapped to exactly k queries which is the size of the test suite (condition 2). Note that any subgraph of the bipartite graph that satisfies conditions 1) and 2) is a valid test suite. The node cost for the query nodes is used to model the fact that for queries shared between multiple rules, the original Plan(q) needs to be executed only once.

The execution of the test-suite proceeds as:
For each q, execute Plan(q) once.
For each edge (q, r), execute the $Plan(q, \neg\{r\})$ and compare the results with those obtained from Plan(q).

Thus, the sum of the edge and node costs is equal to the cost of executing the test suite. Because the out-degree of each node r in the subgraph is known to be k, the process is guaranteed to execute k distinct queries for each rule in the set R.

The test suite compression thus can significantly improve the efficiency of correctness testing of rules; however test suite compression is computationally hard (NP-Hard). However, note that the known "Set Cover problem" is isomorphic to a simplified version of the test suite compression problem (that uses a test suite size k=1), and thus approximation algorithms that exist for the set cover problem may be modified for the test suite compression problem.

Note that the simplified version of the test suite compression problem uses a test suite size k=1. To incorporate this parameter, an algorithm for the corresponding general version of the set cover problem, referred to as the constrained set multicover problem is adapted. The constrained set multicover problem takes as input a set U, a number $m_e$ for each $e \in U$, and a set of subsets S of elements in U. Each $s \in S$ has a cost C(s). A general goal is to find the subset with the minimal cost such that each element e of U is covered $m_e$ times, and each $s \in S$ can be picked at most once.

The test suite compression problem can be mapped to the constrained set multicover problem by mapping the set of rules R to input set U; for each query q, RuleSet(q) is mapped to the corresponding subset s, and the node cost Cost(q) mapped to the corresponding C(s). For all rules r in the set, $m_r$ is set to k.

The following shows how a greedy algorithm may be adapted to compute the set of queries with minimal cost such that each rule is mapped to exactly k distinct queries in the test suite:

Input: Bipartite Graph $G = ((R \cup TS), E)$, Test Suite Size k
Output: A bipartite graph $G' = ((R \cup TS'), E')$, a subgraph of G with outdegree of each node in R = k
Step 1.   TS' = { }, R' = { }, E' = { }
Step 2.   While (R' != R) Do
Step 3.       For each q ∈ (TS – TS'), compute
              Benefit(q) = number of remaining rules covered / Cost(q)
Step 4.       Pick q ∈ (Q – Q') with the largest Benefit value
Step 5.       TS' = TS' ∪ {q}; R' = R' ∪ RuleSet(q);
Step 6.       Add edges corresponding to q and the remaining rules it covers, to E'.
Step 7.   End While
Step 8.   Return G' = ((R ∪ TS'),E')

The algorithm collects queries to be picked in the set TS', and tracks the set of rules that have already been covered in R'. Step 2 checks if the set of rules that have been covered in R' is complete. Note that this step includes the check that each rule in R has been covered k times.

Step 3 computes the "benefit" of each query that has not been picked. A rule is referred to as "remaining" if it is exercised by less than k of the queries already picked; the benefit of a query is defined as the number of remaining rules that are covered normalized by the cost of the query. For example consider a query q with RuleSet(q)={$r_1$, $r_2$, $r_3$}. Let the test suite size k be set to 2. Assume that the rule $r_1$ has already been covered by two queries in the set TS'. The remaining rules for query q are thus {$r_2$, $r_3$}. The greedy algorithm picks the query with the highest "benefit" (Step 4).

In the above example where query $q_1$ exercises the rule {$r_1$} and $q_2$ exercises the rules {$r_1$, $r_2$}, because Cost($q_1$)=Cost($q_2$), $q_2$ has the higher benefit and as a result the above greedy algorithm finds the optimal solution for the example. In general, however, this algorithm tries to minimize the total cost of the query nodes in the subgraph and does not model the edge costs, which account for the costs of executing queries with the corresponding rules disabled. Because in general the edge costs may be significant, an alternative algorithm is described that takes into account the edge costs.

To take into account the edge costs, an alternative algorithm selects for each rule the k queries with the lowest cost with that rule disabled (i.e., the edge cost). This algorithm assumes independence between the rules, thereby ignoring the benefits obtained from potentially sharing queries between the test suites of different rules. The following is an implementation of this alternative algorithm, a constant factor approximation algorithm, referred to as the TopKIndependent algorithm:

---

Input: Bipartite Graph G = ((R ∪ TS), E),Test Suite Size k
Output: A bipartite graph G' = ((R ∪ TS'), E'), a subgraph of G with
    outdegree of each node in R = k
Step 1.    TS' = { }, R' = { }, E' = { }
Step 2.    For each rule r in R Do
Step 3.        count = 0
Step 4.        Let W = Subset of queries in TS that includes rule r in its
        RuleSet
Step 5.        While (count < k) Do
Step 6.            Pick q ∈ W with minimal value Cost(q,¬{r}) value
Step 7.            W = W − {q}
Step 8.            TS' = TS' ∪ {q}; count = count+1
Step 9.            Add edge corresponding to (r,q) to E'
Step 10.       End While
Step 11.       R' = R' ∪ RuleSet(q);
Step 12    End For
Step 13.   Return G' = ((R ∪ TS'),E')

---

For each rule r in the set R, the set of all queries in TS that exercise rule r is obtained (Step 4). The loop (steps 5-10) picks the k queries with the lowest edge cost, i.e., the cost of the query when the rule r is disabled. This step is repeated for all the rules in the set R. Referring again to the above example, where $q_1$ exercises {$r_1$} and $q_2$ exercises the rules {$r_1$, $r_2$}, because k is 1, the TopKIndependent algorithm chooses the query that has the minimum edge cost for each rule. For both the rules, $q_2$ has the smaller edge cost when compared to $q_1$. Thus, the TopKIndependent algorithm in also finds the optimal solution.

Although the TopKIndependent algorithm ignores query node costs, it provides a solution that can be proven to be guaranteed to be within a factor two of the optimal solution. Note that the SetMultiCover algorithm, on the other hand does not provide such a constant factor approximation.

The above cost ignores Cost(q), however, it is a valid lower bound on the cost of any solution. Notice that for any rule r and query q, Cost(q)≤Cost(q,¬{r}), because disabling a rule (for a well-behaved optimizer) can only increase the cost of the resulting plan. This is because when a rule is disabled, it may not impact the plans considered by the optimizer, in which case the resulting plan (and hence the cost) is the same, or it can reduce the number of plans considered by the optimizer, in which case the cost of the plan chosen can only be higher.

Figure 8:
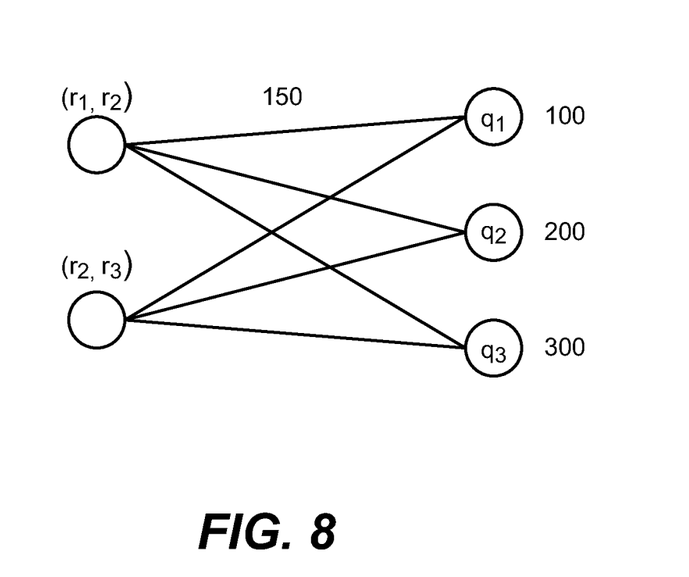
FIG. 8 is a representation of a bipartite graph in which rule nodes and query nodes are connected by edges with associated costs used to select a subset of the graph to obtain a test suite of queries.

The above-described algorithms may be extended for testing pair-wise rule interactions. The test suite compression problem for testing rule pairs is similar to the original formulation, with a difference being that the input is a set of rule pairs rather than a set of individual rules, denoted by $\mathcal{P}$ ={{$r_1$, $r_2$}, {$r_1$, $r_3$}, ... {$r_{n-1}$, $r_n$}}. Thus, for each element p∈ $\mathcal{P}$, the mapping of k distinct queries needs to be found such that the cost of executing the test suite is minimized. An example of the bipartite graph corresponding to the test suite compression problem for rule pairs is shown in FIG. 8. Note that an edge is added between a rule node and a query node (q) only if both the corresponding rules are exercised when query q was optimized.

In the example bipartite graph shown in FIG. 8, the queries exercise both rule pairs. For an edge between a rule node {$r_i$, $r_j$} and a query q, the edge cost is the cost of executing q with both rules disabled, i.e., Cost(q, ¬{$r_i$, $r_j$}). Thus the cost of executing $q_1$ when both $r_1$ and $r_2$ are disabled is 150, for example.

The above-described algorithms extend in a straightforward manner for the case of rule pairs. However, a difference is that the cost of creating the bipartite graph which is an input to both algorithms itself can become significant. Note that the increase in the cost of constructing the bipartite graph only affects the TopKIndependent algorithm, (because the other algorithm does not model the edge costs and uses only the query node costs as a basis for selecting nodes).

For the TopKIndependent algorithm, to help reduce the number of edges for which the cost needs to be determined by the algorithm (in Steps 5-10), observe that for any query, Cost(q)≤Cost(q, ¬R), where R is any subset of rules in RuleSet(q). Suppose for a rule pair p the queries that exercise the rule pair is TS(p). A general goal is to find the k edges (with lowest cost) from p to queries in TS(p). Queries in TS(p) are sorted in increasing order of the original node cost, i.e. by Cost(q). A priority queue of size k of edges for which the actual cost computed by invoking the optimizer is maintained. Initially, the priority queue is empty. Each time the next edge (e.g., e) from TS(p) is considered, a check is made as to whether the node cost corresponding to that edge has a higher value than the edge with the kth highest cost in the priority queue. If so, it can be terminated because the cost of the edge e (and all remaining edges for p) have a higher cost. If not, the actual cost is computed and an edge added to the priority queue (potentially evicting an existing edge with the highest cost to maintain the size of k in the priority queue). This optimization has been shown to significantly reduce the costs of creating the bipartite graph for testing rule pairs.

By way of example of the above optimization, consider the bipartite graph shown in FIG. 8 with a test suite size of k=1. For the node {$r_1$, $r_2$}, the edge with minimum cost needs to be found; this may be achieved without having to compute all the edge costs. Consider the set of all queries with edges to {$r_1$, $r_2$}, which in this example is {$q_1$, $q_2$, $q_3$}. The queries are ordered in the increasing order of node costs. The edge cost for query $q_1$, i.e. (Cost ($q_1$, ¬{$r_1$, $r_2$}) is computed by invoking the query optimizer, which in FIG. 8 is shown to be 150 units. Note that the original query cost of $q_2$(200) and $q_3$(300) are higher than this value. This implies that the corresponding edge costs can only be higher (since disabling a pair of rules can only increase the cost of the resulting plan). Thus, the process can stop enumerating the edges at this point and return the current edge (corresponding to $q_1$) as the minimal cost edge.

As described above, given an original test-suite, test suite compression attempts to find a least-cost mapping of queries to rules while preserving the invariant that each rule is mapped to k distinct queries. Queries may be reused for validating different rules. An alternative is to preserve the distinct queries in the original test suite, that is, there is no sharing of queries across rules. Test suite compression with this alternative attempts to find the least-cost mapping of queries to rules such that each query in the original test suite is mapped to exactly one rule. Such a problem reduces to bipartite matching and thus can be solved efficiently.

Note that a rule is considered relevant for a query if turning off the rule results in the optimizer selecting a different query plan, and thus query generation may be directed to generating a SQL query for a rule such that the rule is relevant for the query. As described above, there are other potential definitions of rule interactions, e.g., a rule $r_2$ is exercised on an expression which was obtained as a result of exercising rule $r_1$. Further, while the above techniques apply to a fixed database, which applies to a large class of transformation rules, there are certain rules whose exercising is dependent on the properties of the schema as well as the database instance. For example, consider a transformation rule that optimizes star join queries. For this rule to be exercised, certain foreign key constraints need to be defined in the schema. In order to capture such rules, the query generation module may be adapted to modify the schema and/or the database instance.

Exemplary Operating Environment

Figure 9:
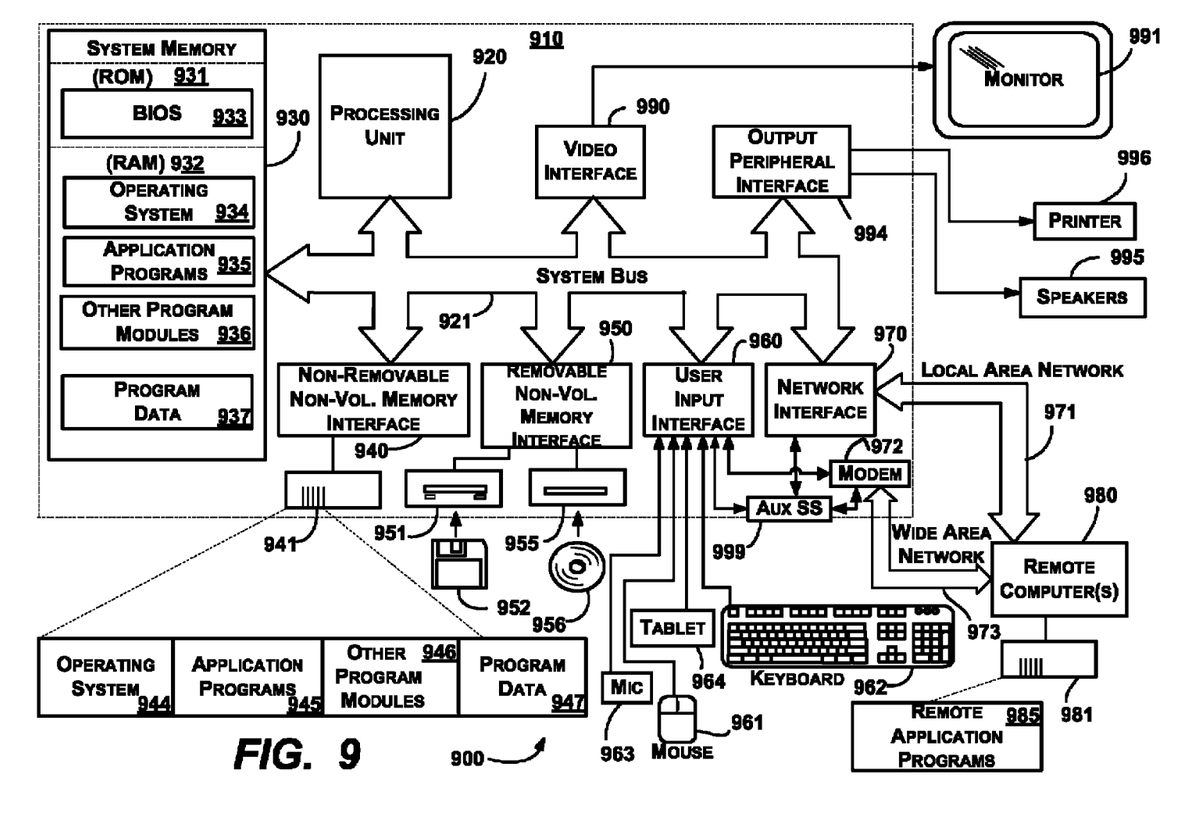
FIG. 9 shows an illustrative example of a computing environment into which various aspects of the present invention may be incorporated.

FIG. 9 illustrates an example of a suitable computing and networking environment 900 on which the examples of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor comprising:
    obtaining one or more rule patterns corresponding to one or more transformation rules of a transformation rule-based query optimizer of a database management system;
    generating one or more queries based upon the one or more rule patterns;
    mapping the one or more queries to the one or more transformation rules to generate a test suite for query processing;
    providing the test suite to the transformation rule-based query optimizer for query processing;
    receiving information from the database management system that indicates which of the one or more transformation rules are exercised during the query processing;
    determining a test suite of queries for testing the one or more transformation rules; and
    compressing the test suite of queries for testing the one or more transformation rules into a subset of queries, including processing data corresponding to a graph comprising a plurality of rule nodes each representing one or more rules and a plurality of query nodes representing queries, to select the transformation rule based upon cost information associated with the query nodes and one or more criteria including that each rule is exercised a specified number of one or more times by the subset.

2. The method of claim 1 further comprising, receiving results of the query processing, instructing the optimizer to turn off a transformation rule that corresponds to a rule pattern, providing the test suite to the rule optimizer for query processing with the transformation rule turned off, receiving results of the query processing with the transformation rule turned off, and determining the correctness of the transformation rule by comparing the results of the query processing against the results of the query processing with the transformation rule turned off.

3. The method of claim 1 wherein the one or more rule patterns corresponds to a tree structure including a generic operator, and wherein generating the one or more queries based upon the one or more rule patterns comprises instantiating a generic operator with an argument to provide another tree based structure, and generating a query language query from the other tree structure.

4. The method of claim 1 wherein obtaining the one or more rule patterns comprises receiving the one or more rule patterns from the database management system.

5. The method of claim 1 wherein generating the one or more queries based upon the one or more rule patterns includes creating a composite pattern that is based upon one rule pattern corresponding to one transformation rule and another rule pattern corresponding to another transformation rule.

6. The method of claim 5 wherein creating the composite pattern comprises combining the rule pattern and the other rule pattern with a UNION operator.

7. The method of claim 5 wherein the one rule pattern corresponds to a tree structure including a generic operator, and wherein creating the composite pattern comprises combining the one rule pattern and the other rule pattern by substituting the other rule pattern into the generic operator of the one rule pattern.

8. The method of claim 5 wherein the one rule pattern corresponds to a first tree structure and the other rule pattern corresponds to a second tree structure, in which each tree structure includes a generic operator, and wherein creating the composite pattern comprises combining the one rule pattern and the other rule pattern into a first composite rule pattern by substituting the other rule pattern into the generic operator of the one rule pattern, combining the other rule pattern and the one rule pattern into a second composite rule pattern by substituting the one rule pattern into the generic operator of the other rule pattern, generating first and second queries from the first and second composite rule patterns, respectively, and selecting the query for providing to the rule optimizer based upon a least number of operators.

9. The method of claim 1 further comprising:
compressing the test suite into a subset of queries, including processing data corresponding to a graph comprising a plurality of rule nodes each representing one or more rules and a plurality of query nodes representing queries, to select the transformation rule based upon cost information associated with edges between the rule nodes and the query nodes and one or more criteria including that each rule is exercised a specified number of one or more times by the subset.

10. The method of claim 9 further comprising sorting the queries based upon query node cost, and maintaining a priority queue of edges and actual costs computed by invoking the optimizer.

11. In a computing environment, a system comprising:
at least one processor;
a database management system implemented on the at least one processor;
a query optimizer associated with the database management system; and
a test framework including a query generation component and a correctness validation component, the query generation component configured to generate queries based upon rule patterns received from the database management system, the query optimizer configured to use transformation rules to optimize queries to be processed by the database management system, including queries received from the test framework, and the correctness validation component configured to provide a test suite of queries to the query optimizer and validates whether results obtained from processing a query of the test suite with a transformation rule that is exercised in query optimization match results obtained from processing the query of the test suite without the transformation rule being exercised in query optimization, wherein the correctness validation component is further configured to compress the test suite into a subset of queries, including processing data corresponding to a graph comprising a plurality of rule nodes each representing one or more rules and a plurality of query nodes representing queries, to select the transformation rule based upon cost information associated with edges between the rule nodes and the query nodes and one or more criteria including that each rule is exercised a specified number of one or more times by the subset.

12. The system of claim 11 wherein the rule pattern corresponds to a tree structure with at least one generic operator, and wherein the query generation component includes a first module that processes the tree structure into a tree structure without a generic operator, and a second module that generates a query language query from the tree structure without the generic operator.

13. The system of claim 12 wherein the first module creates a composite pattern that is based upon the rule pattern and another rule pattern corresponding to another transformation rule, including by substituting one rule pattern into the generic operator of the other rule pattern.

14. The method of claim 12 wherein the first module creates two composite patterns that are based upon the rule pattern and another rule pattern corresponding to another transformation rule, including by substituting the rule pattern into the generic operator of the other rule pattern and substituting the other rule pattern into the generic operator of the rule pattern, and wherein the framework generates first and second queries from the two composite rule patterns and selects the query for providing to the rule optimizer based upon a number of operators in the first query and a number of operators in the second query.

15. The system of claim 11 further comprising, a test suite generation module that provides a test suite of queries based upon a set of rules to be tested.

16. The system of claim 15 further comprising, a test suite compression module that determines which queries comprise the test suite, Including by processing data corresponding to a graph comprising a plurality of rule nodes each representing one or more rules in the set of rules to be tested and a plurality of query nodes representing queries, to select the queries corresponding to a subgraph that is determined from cost information associated with the query nodes.

17. The system of claim 15 further comprising, a test suite compression module that determines which queries comprise the test suite, Including by processing data corresponding to a graph comprising a plurality of rule nodes each representing one or more rules in the set of rules to be tested and a plurality of query nodes representing queries, to select the queries corresponding to a subgraph that is determined from cost information associated with edges between the rule nodes and the query nodes.

18. One or more computer-readable storage device having computer-executable instructions, which in response to execution by a computer, cause the computer to perform steps, comprising:
generating available queries using rule patterns corresponding to transformation rules of a rule optimizer of a database management system;
generating a test suite to test a set of transformation rules of a query optimizer, including compressing the test suite into a subset of the available queries as the test suite to test the set of transformation rules based upon cost information; and for each query in the test suite:
- (a) providing the query to the rule optimizer for query processing;
- (b) receiving information from the database management system that indicates which rule or rules was exercised during the query processing;
- (c) receiving results from the query processing;
- (d) turning off one or more rules that were exercised:
- (e) providing the query to the rule optimizer for query processing with the one or more rules turned off;
- (f) receiving information from the database management system that indicates which rule or rules was exercised during the query processing with the one or more rules turned off;
- (g) receiving results from the query processing with the one or more rules turned off; and
- (h) determining whether the results obtained from processing the query with the one or more rules turned off match the results obtained from processing the query without the one or more rules turned off.

19. The computer-readable device of claim 18 wherein using the rule patterns comprises combining two or more rule patterns into a composite rule pattern and using the composite rule pattern to generate the available queries.

20. The computer-readable device of claim 18 wherein compressing the test suite into a subset of queries further comprises processing data corresponding to a graph comprising a plurality of rule nodes each representing one or more rules and a plurality of query nodes representing queries, to select the transformation rule based upon cost information associated with the query nodes and one or more criteria including that each rule is exercised a specified number of one or more times by the subset.

* * * * *